(12) United States Patent
Nakamura et al.

(10) Patent No.: US 8,807,595 B2
(45) Date of Patent: Aug. 19, 2014

(54) CURTAIN AIRBAG

(75) Inventors: Yuuki Nakamura, Yokohama (JP); Yutaka Nakajima, Yokohama (JP)

(73) Assignee: Autoliv Development AB, Vårgårda (SE)

( * ) Notice: Subject to any disclaimer, the term of this patent is extended or adjusted under 35 U.S.C. 154(b) by 0 days.

(21) Appl. No.: 13/822,732

(22) PCT Filed: Aug. 25, 2011

(86) PCT No.: PCT/JP2011/069200
§ 371 (c)(1),
(2), (4) Date: Mar. 13, 2013

(87) PCT Pub. No.: WO2012/035949
PCT Pub. Date: Mar. 22, 2012

(65) Prior Publication Data
US 2013/0168950 A1    Jul. 4, 2013

(30) Foreign Application Priority Data
Sep. 13, 2010    (JP) ................... 2010-204481

(51) Int. Cl.
*B60R 21/213*    (2011.01)

(52) U.S. Cl.
USPC .................... 280/730.2; 280/728.2

(58) Field of Classification Search
USPC ............... 280/728.2, 729, 730.2, 749
See application file for complete search history.

(56) References Cited

U.S. PATENT DOCUMENTS

| 6,010,149 | A  | * | 1/2000  | Riedel et al. | ........... 280/730.2 |
| 6,152,485 | A  | * | 11/2000 | Kato | ........... 280/749 |
| 6,290,253 | B1 | * | 9/2001  | Tietze et al. | ........... 280/730.2 |
| 6,394,487 | B1 | * | 5/2002  | Heudorfer et al. | ........... 280/729 |
| 6,672,612 | B2 | * | 1/2004  | Sauer et al. | ........... 280/730.2 |
| 6,736,422 | B2 | * | 5/2004  | Nakanishi | ........... 280/730.2 |
| 6,830,262 | B2 | * | 12/2004 | Sonnenberg et al. | ........... 280/730.2 |
| 6,971,665 | B2 | * | 12/2005 | Tanaka | ........... 280/729 |
| 7,744,121 | B2 | * | 6/2010  | Ishikawa et al. | ........... 280/730.2 |
| 2006/0071460 | A1 | * | 4/2006 | Goto | ........... 280/730.2 |
| 2007/0138778 | A1 | * | 6/2007 | Takemura et al. | ........... 280/743.1 |
| 2007/0164543 | A1 | * | 7/2007 | Fukuda et al. | ........... 280/729 |
| 2008/0290634 | A1 | * | 11/2008 | Sugimori et al. | ........... 280/728.2 |
| 2009/0001694 | A1 | * | 1/2009 | Imamura | ........... 280/730.2 |
| 2010/0133795 | A1 | * | 6/2010 | Fukuda et al. | ........... 280/730.2 |
| 2010/0225097 | A1 | * | 9/2010 | Trovato et al. | ........... 280/730.2 |

FOREIGN PATENT DOCUMENTS

| JP | 11263184 | 9/1999 |
| JP | 2006-111199 | 4/2006 |
| JP | 2007022279 | 2/2007 |

(Continued)

OTHER PUBLICATIONS

International Search Report of PCT/JP2011/069200, Mailed on Nov. 1, 2011, 3 pages.

*Primary Examiner* — Paul N Dickson
*Assistant Examiner* — Robert A Coker
(74) *Attorney, Agent, or Firm* — Brinks Gilson & Lione

(57) ABSTRACT

A curtain airbag for mitigating vehicle occupant ejection. The curtain airbag is stored in the upper portion of a side face section in the interior of a vehicle and is inflated and deployed along the side face section. The curtain airbag includes a front chamber partitioned at the frontmost side of an inflation region. The front chamber is inflated and deployed overlapping a divider-bar that separates a side window from a front pillar window.

8 Claims, 5 Drawing Sheets

(56) References Cited

FOREIGN PATENT DOCUMENTS

| JP | 2008207667 | | | 9/2008 |
|----|------------|---|---|--------|
| JP | 2008207667 | A | * | 9/2008 |
| JP | 2009286300 | | | 12/2009 |
| JP | 2009286300 | A | * | 12/2009 |

* cited by examiner (a)

(b)

Cross-section A-A

Cross-section B-B

CURTAIN AIRBAG

BACKGROUND

1. Field of the Invention

The present invention relates to a curtain airbag that is inflated and deployed along a side face section inside a vehicle cabin for the purpose of vehicle occupant protection during a lateral collision or rollover (overturning) of a vehicle.

2. Related Technology

In recent years, high levels of safety performance have been required of vehicles. This trend is shared across countries around the world, where most vehicles are currently standard-equipped with airbags as vehicle safety devices. Firms involved in vehicle development have adopted ongoing safety improvements as a major development guideline. In keeping with this, new airbags are continually being developed.

Standards for evaluating vehicle safety differ from country to country, and firms approach product development such that products can meet evaluation standards in multiple countries. In the United States, for instance, which has the largest automobile fleet in the world, Federal Motor Vehicle Safety Standards (FMVSS) are issued by the National Highway Traffic Safety Administration (NHTSA). At present, in a Notice of Proposed Rulemaking (NPRM, Docket Number: NHTSA-2009-0183) for FMVSS, scheduled to be issued by the NHTSA, a requirement is proposed that aims at "reducing the probability of occupant ejection from a vehicle through a side window using an ejection mitigation system in the event of a side impact crash or rollover (overturning)". The requirement can be met by providing a curtain airbag as a device intended to reduce ejection from a vehicle, such that the curtain airbag constitutes the ejection mitigation system.

A curtain airbag is an airbag disposed above a door and that inflates and deploys along vehicle side windows, upon occurrence of an impact, to protect an occupant thereby (for instance, Japanese Patent Application Publication No. 2006-111199. An ordinary curtain airbag is designed to have a pressure duration, when inflated and deployed, longer than that of a front airbag or the like. That is because the time during which an impact unfolds is lengthened if, for instance, rollover follows the lateral collision. Thus, the curtain airbag is intended to maintain the inflated state until and during rollover, to restrain thereby the occupant, and prevent the occupant from being ejected from the vehicle.

At present, yet better ejection mitigation performance is required of airbags. The inflation region of ordinary curtain airbags is partitioned into a plurality of divisions (chambers). The chamber against which the occupant strikes, from among the plurality of chambers, differs depending on the circumstances at the time of impact. During rollover, for instance, it is observed that the posture of the occupant of the front seat collapses significantly, and the head of the occupant is likely to strike the front chamber at the frontmost side of the vehicle. Unlike a chamber around the middle, which is connected, on both sides to other chambers in the front-rear direction of the vehicle, the front chamber is connected only to another chamber from the rear. Therefore, the load received by the front chamber was hardly absorbed by other chambers, and the displacement amount of the front chamber towards the vehicle exterior was larger than that of other chambers.

SUMMARY

In the light of the above issue, it is an object of the present invention to provide a curtain airbag having enhanced ejection mitigation performance in particular at a front chamber.

In order to solve the above problems, a curtain airbag according to the present invention is, in a typical configuration: a curtain airbag that is stored in an upper portion of a side face section in the interior of a vehicle and that is inflated and deployed along the side face section, this curtain airbag including: a front chamber partitioned at a frontmost side of an inflation region; wherein the front chamber is inflated and deployed overlapping a divider-bar that separates a side window from a front pillar window.

When an occupant strikes the front chamber from the vehicle interior, the front chamber interferes with the divider-bar that is present on the vehicle exterior side of the front chamber. It is deemed that the side window is open during a collision, and hence evaluation of the ejection mitigation performance must assume that the side window is absent. However, the divider-bar is obviously present at all times, and hence displacement of the front chamber towards the vehicle exterior is hindered by the divider-bar, so that the likelihood of occupant ejection is lower. By virtue of the above configuration, thus, high ejection mitigation performance can be brought out, in particular in the front chamber.

The curtain airbag may be further provided with at least one tab that fixes the front chamber to the vehicle at an upper edge of the front chamber; wherein the tab is provided on a straight line that joins, in the shortest way, a front pillar of the vehicle and an impact point center, which is the center of a frontmost assumed impact area, in a vehicle front-rear direction, from among assumed impact areas that are struck by an impactor that simulates an occupant in an occupant ejection mitigation performance evaluation test.

Herein, the assumed strike area is a region that may be run through by an impactor as defined according to NPRM (NHTSA-2009-0183), V. "Proposed Ejection Mitigation Requirements and Test Procedures", when an ejection test is carried out for target locations as defined in NPRM V. "Proposed Ejection Mitigation Requirements and Test Procedures", d. "Locations Where the Device Would Impact the Ejection Mitigation Countermeasure To Assess Efficacy", 4. "Method for Determining Impactor Target Locations". The impact point center of the assumed strike area is defined by respective points detected by impact point positions at the center of respective targets set forth in NPRM, for instance, impact points A1 to A4.

The Notice of Proposed Rulemaking (NPRM: Docket Number: NHTSA-2009-0183) in the description of the present application is based on FMVSS 226 as officially enacted.

When the front chamber receives a load from the impactor, tension lines form radially, in the front chamber, from the impact point center. In the load-receiving front chamber, tabs afford greater load absorption the closer the installation position of the tabs is to the impact point center. Therefore, the tabs allow absorbing appropriately the load that acts on the front chamber, and curtailing the extent of protrusion of the front chamber towards the vehicle exterior.

The tab may be provided vertically above the impact point center. That position lies on a tension line that is formed at all times on account of the weight of the front chamber itself. Therefore, it becomes possible to absorb appropriately the load of the front chamber.

The curtain airbag may be further provided with a cloth-like tension support section that joins a vehicle front side of the front chamber and a front pillar further toward the vehicle front side than the front chamber and that supports the curtain airbag.

The above tension support section allows restricting the deployment behavior of the curtain airbag, and curtailing the displacement amount of the curtain airbag towards the vehicle exterior when an occupant strikes the airbag. Therefore, the deployment behavior is stabilized, and the ejection mitigation performance can be further enhanced.

A lower edge section of the front chamber may overlap a door beltline of a front door. Accordingly, the lower edge section interferes with a door trim when an occupant strikes the front chamber from the vehicle interior. Therefore, it becomes possible to curtail the displacement amount of the front chamber towards the vehicle exterior.

The front chamber may have a gas inflow port that limits a reception amount of gas per unit time from an adjacent chamber, such that inflation and deployment of the front chamber are implemented after the implementation with respect to other chambers.

The front chamber mainly restrains an occupant during rollover. Rollover occurs following a lateral collision or the like, and hence a corresponding time lag arises between sensing of a collision by a sensor until the point in time at which the front chamber is needed. In the above configuration, accordingly, supply of gas to the front chamber is delayed, to control inflation as a result in such a manner that pressure is highest during rollover.

The present invention succeeds in providing a curtain airbag having enhanced ejection mitigation performance in particular at a front chamber.

DETAILED DESCRIPTION

Figure 1:
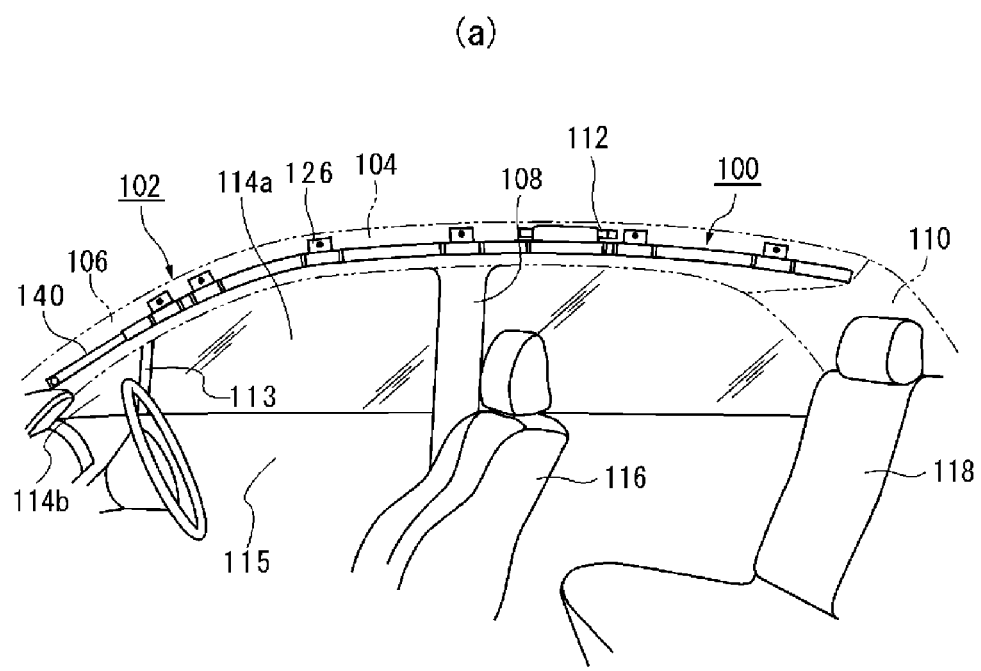
FIGS. 1(a) and 1(b) are a set of diagrams illustrating a curtain airbag according to an embodiment of the present invention.
Figure 1:
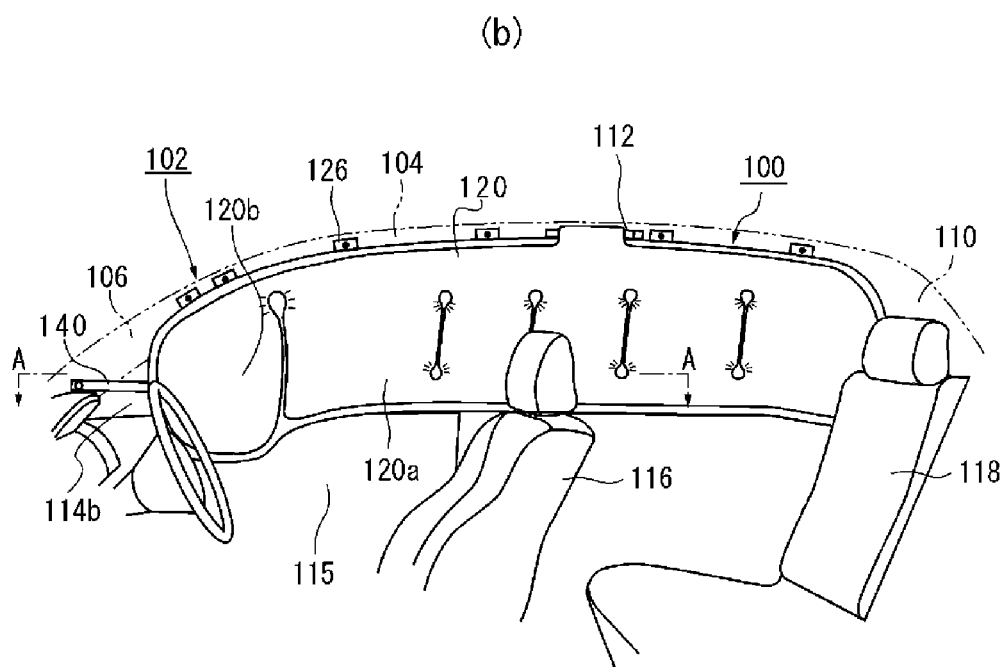

Preferred embodiments of the present invention will be explained next in detail with reference to accompanying drawings. Dimensions, materials, other specific numerical values and the like given in the embodiments are only illustrative in character, for the sake of easier understanding of the invention, and, unless particularly stated otherwise, are not meant to limit the present invention in any way. In the description and the drawings, elements having substantially the same function and configuration are denoted by identical reference numerals, and a recurrent explanation thereof will be omitted. Elements that are not directly related to the present invention are omitted in the drawings.

FIGS. 1(a) and 1(b) are a set of diagrams illustrating a curtain airbag according to an embodiment of the present invention. FIG. 1(a) illustrates schematically a curtain airbag (hereafter also referred to as "airbag 100") when undeployed, and FIG. 1(b) illustrates the airbag 100 when deployed. The explanation below will refer to the curtain airbag of the right side face of the vehicle 102 illustrated in FIG. 1(a) and FIG. 1(b), but a curtain airbag for the left side face has a similar structure but symmetrical with respect to that of the right side.

The airbag 100 in a rolled-up state as shown in FIG. 1(a) or in a folded state (not shown) is attached to, and accommodated in, a roof side rail 104 (in the figure, denoted by a virtual line) located and stored at an upper portion of a side face section of the vehicle cabin. Ordinarily, the roof side rail 104 is covered with a roof trim, and is invisible from inside the vehicle cabin. A plurality of pillars that support the roof (top) are connected to the roof side rail 104. These pillars are referred to, in order from the front section of the vehicle 102, as a front pillar (A-pillar) 106, a center pillar (B-pillar) 108 and a rear pillar (C-pillar) 110.

A divider-bar 113 is provided below the front pillar 106. The divider-bar 113 divides a side window 114a from a front pillar window 114b. The front pillar window 114b is a small window positioned below and toward the front end of the front pillar 106. The front pillar window 114b is part of a front door 115 (i.e. opens and closes together with the front door 115), but in some instances, depending on the vehicle model, the front pillar window 114b is positioned frontward of the door hinge, and is part of the body (i.e. does not open and close together with the front door 115). In all cases, the front pillar window 114b does not open and close in response to opening and closing of the side window 114a, and the divider-bar 113 is a window frame (glass run) that guides the side face of the window glass.

The airbag 100 is formed into a bag-like shape through sewing of the front and back sides of a base fabric, which constitutes the surface of the airbag 100, or by weaving using One-Piece Woven (OPW).

The airbag 100 is provided with an inflator 112, which is a gas generating device. Upon occurrence of a lateral collision or rollover (overturning) in the vehicle 102, firstly a sensor (not shown) that is provided in the vehicle 102 senses the impact, and an ignition signal is accordingly transmitted to the inflator 112. The explosive in the inflator 112 burns thereupon, and the generated gas for inflation and deployment (hereinafter simply referred to as "gas") is supplied to the airbag 100.

Upon receiving the gas from the inflator 112, the airbag 100 inflates and deploys downward along the side face section of the vehicle cabin (side window 114a and so forth), as illustrated in FIG. 1(b), to protect an occupant thereby. The airbag 100 thus can protect simultaneously occupants of the front seat 116 and the rear seat 118.

Figure 2:
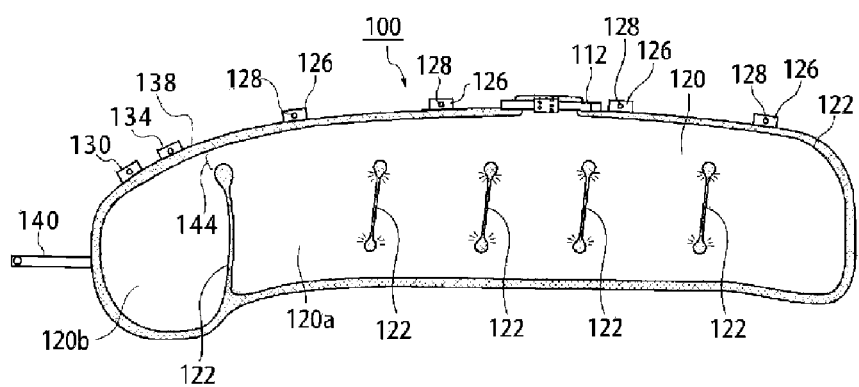
FIG. 2 is a diagram illustrating the curtain airbag of FIG. 1(b) in a deployed state.

FIG. 2 is a diagram illustrating the curtain airbag of FIG. 1(b) in a deployed state. FIG. 2 illustrates the airbag 100 in a state where the side of the vehicle cabin is partially visible.

As illustrated in FIG. 2, the airbag 100 comprises an inflation region 120 that inflates by receiving a gas upon collision or overturning of the vehicle 102, and a non-inflation region 122 (depicted by hatching in the figure) that does not inflate and that demarcates the inflation region 120. The inflation region 120 covers the side window 114a and so forth of the vehicle 102, by virtue of which occupants are prevented from being ejected.

The upper edge of the airbag 100 is provided with a plurality of tabs 126 as attachment members to the vehicle 102. The tabs 126 are provided with bolt holes 128, such that the tabs 126 are fixed to the roof side rail 104 through bolt fastening.

The inflation region 120 is partitioned into a plurality of chambers by the non-inflation region 122. A main chamber 120a is disposed slightly to the front of the center of the airbag 100 in the front-rear direction. The main chamber 120a inflates and deploys at a position substantially just beside the front seat 116 (FIG. 1(b)). The front chamber 120b is disposed frontmost in the front-rear direction of the airbag 100. The front chamber 120b inflates and deploys at the front end of the airbag 100. The front chamber protects the occupant, whose posture collapses significantly on account of impact.

Unlike the main chamber 120a that is connected to other chambers, on both sides in the front-rear direction of the vehicle 102, the front chamber 120b is connected to another chamber (main chamber 120a) only at a vehicle rearward portion. Accordingly, the load acting on the front chamber 120b when the latter is struck by an occupant from the vehicle interior is hardly absorbed by other chambers. Therefore, the front chamber 120b is more likely to be displaced towards the exterior as compared with other chambers. Accordingly, the airbag 100 is designed in such a manner that the front chamber 120b inflates and deploys overlapping the divider-bar 113.

Figure 3:
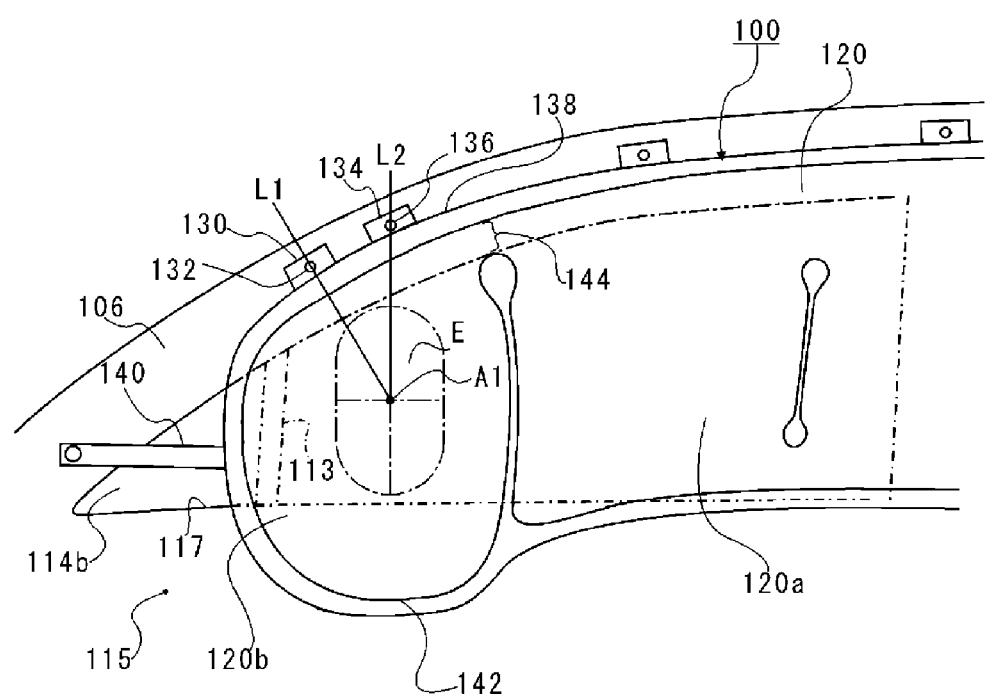
FIG. 3 is a partial enlarged diagram of FIG. 1(b)

FIG. 3 is a partial enlarged diagram of FIG. 1(b). As illustrated in FIG. 3, part of the inflated and deployed front chamber overlaps the divider-bar 113. In other words, the front chamber inflates and deploys on the vehicle interior side of the divider-bar 113.

FIG. 3 is a partial enlarged diagram of a curtain airbag attached to a vehicle. The assumed strike area E illustrated in FIG. 3 is a region that may be run through by an impactor 160 (FIG. 4(b)) as defined according to NPRM (NHTSA-2009-0183), V. "Proposed Ejection Mitigation Requirements and Test Procedures", when an ejection test is carried out for target locations as defined in NPRM V. "Proposed Ejection Mitigation Requirements and Test Procedures", d. "Locations Where the Device Would Impact the Ejection Mitigation Countermeasure To Assess Efficacy", 4. "Method for Determining Impactor Target Locations". The assumed strike area E above the front chamber is an assumed strike area at the frontmost side of the side window 114a.

During a lateral collision test based on NPRM (NHTSA-2009-0183, hereafter FMVSS 226), the impactor 160, which is the test device, is caused to strike a predetermined impact point that is set on the curtain airbag, to evaluate thereby the safety of the curtain airbag (ejection mitigation performance evaluation test). In particular, a center impact point (center of the assumed strike area E), which is set on the front chamber 120b, at the frontmost side of the side window 114a, is referred to as an A1 impact point. The A1 impact point is defined, according to NPRM, as an impact point that is positioned on the vehicle front side of a primary target position (primary target) in a front window.

The front chamber is fixed to the front pillar 106 by at least one tab. In the present embodiment, the front chamber is provided with a first tab 130 toward the vehicle front side, and a second tab 134, toward the vehicle rear side, at an upper edge 138 of the front chamber.

The first tab 130 is provided on a straight line L1 that joins the A1 impact point and the upper edge 138 of the front chamber in the shortest way. The straight line L1 joins the A1 impact point and the front pillar 106 in the shortest way, as viewed from the vehicle interior. The first tab 130 is configured such that a bolt hole 132 (fixed point) is positioned on the straight line L1.

The second tab 134 is provided vertically above the A1 impact point. The second tab 134 is configured in such a manner that a bolt hole 136 is positioned on a vertical line (straight line L2) that passes through the A1 impact point.

When the front chamber receives a load from the impactor 160, tension lines form radially, in the front chamber, from the impact point center up to the tabs. In the case of FIG. 3, the straight lines L1, L2 are tension lines. The tabs afford greater load absorption the closer the installation position of the tabs is to the impact point center. In the present embodiment, the first tab 130 is the tab that is closest to the A1 impact point. Therefore, providing the first tab 130 allows absorbing appropriately the load that acts on the front chamber, and to curtail the extent of protrusion of the front chamber towards the vehicle exterior.

A straight line L2 that joins the second tab 134 and the A1 impact point is a vertical line, such that a tension line is formed at all times on the straight line L2, on account of the weight of the front chamber itself. Therefore, providing the second tab 134 makes it possible to absorb appropriately the load of the front chamber.

A tension support section 140 is disposed on the vehicle front side of the front chamber. The tension support section 140, which is a cloth-like section, supports the airbag 100 through joining of the front chamber and the front pillar 106 on the vehicle front side of the front chamber. The tension support section 140 has the effect of restricting and stabilizing the deployment behavior of the airbag 100, and curtailing the displacement amount of the curtain airbag 100 towards the vehicle exterior when an occupant strikes the airbag 100. In the present embodiment, the tension support section 140 is a belt-like section, but may have shaped in the form of a wide band.

A lower edge section 142 of the front chamber overlaps a door beltline 117 of the front door 115. When the occupant strikes the front chamber from the vehicle interior, the lower edge section 142 interferes with a door trim 119 (FIG. 5), even if the side window 114a is broken and open. As a result, it becomes possible to further curtail the displacement amount of the front chamber towards the vehicle exterior.

The front chamber 120b constitutes a so-called delay chamber that finishes inflating and deploying with some delay with respect to the other chambers. The front chamber has a gas inflow port 144 at the upper portion, such that the front chamber receives gas from the main chamber 120a via the gas inflow port 144. Gas flow passages to the front chamber 120b are limited to the gas inflow port 144 alone. The reception amount of gas per unit time in the front chamber 120b is restricted as a result.

The front chamber is a delay chamber, and hence the front chamber can respond more readily against rollover. The front chamber mainly restrains an occupant whose posture collapses significantly upon rollover. Rollover occurs following a lateral collision or the like, and hence some time lag arises accordingly between sensing of a collision by a sensor until the point in time at which the front chamber is needed. In the present embodiment, accordingly, supply of gas to the front chamber is delayed, to control inflation as a result in such a manner that pressure is highest during rollover.

Figure 4:
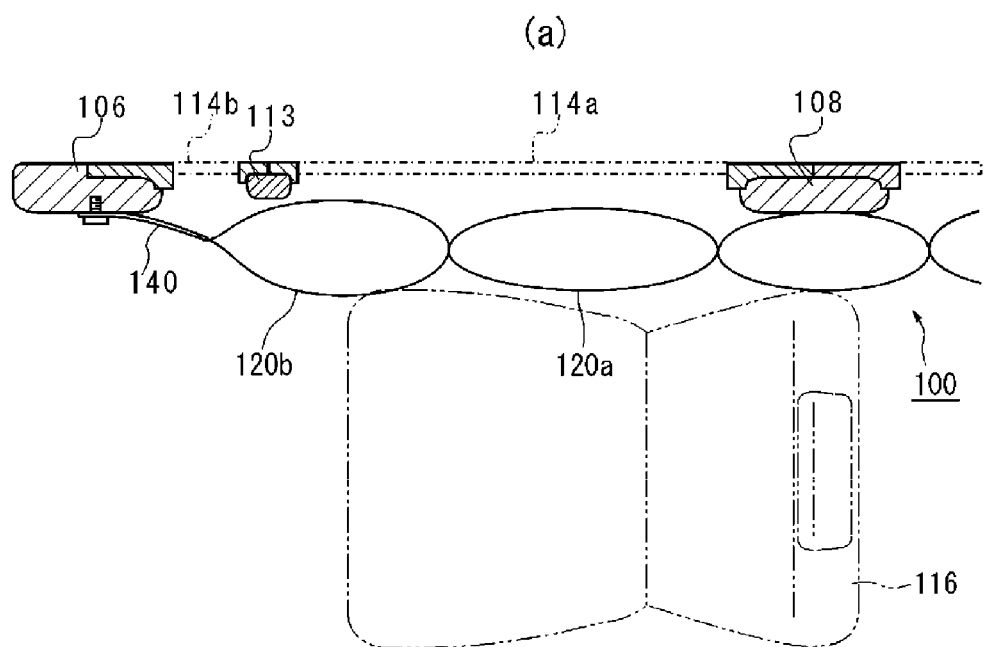
FIGS. 4(a) and 4(b) are a set of diagrams illustrating an ejection mitigation performance evaluation test.
Figure 4:
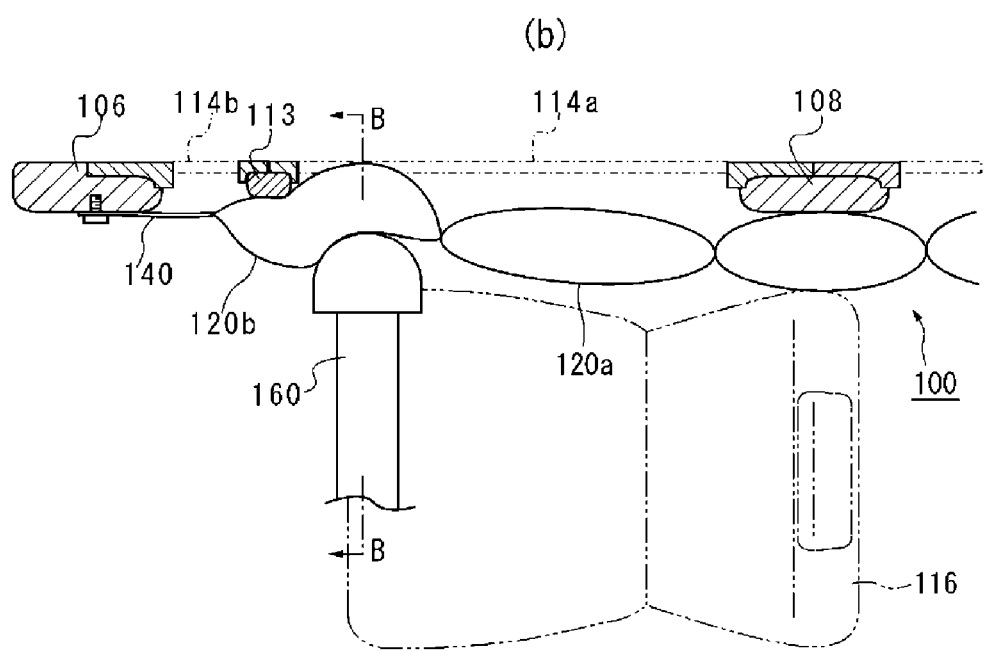

FIGS. 4(a) and 4(b) are a set of diagrams illustrating an ejection mitigation performance evaluation test. FIGS. 4(a) and 4(b) correspond to a cross-sectional diagram generally taken along line A-A of FIG. 1(b). In FIGS. 4(a) and 4(b), the ejection mitigation performance evaluation test is performed in a state where the side window 114a and so forth are open or removed, and hence the side window 114a and the front pillar window 114b are denoted by virtual lines.

In NPRM (NHTSA-2009-0183, hereafter FMVSS 226), the impactor 160 that simulates an occupant is caused to strike various sites of the airbag 100, as illustrated in FIG. 4(b), to evaluate the performance of the airbag 100. It is required that the farthest displacement distance of the impactor 160 outward of the vehicle should be no greater than 100 mm from the contact surface with the side window 114a.

As illustrated in FIG. 4(a), the front chamber inflates and deploys on the vehicle interior side of the divider-bar 113. When the impactor 160 strikes the front chamber, from the vehicle interior side, therefore, displacement of the front chamber towards the vehicle exterior is hindered through interference between the front chamber and the divider-bar 113, as illustrated in FIG. 4(b).

Figure 5:
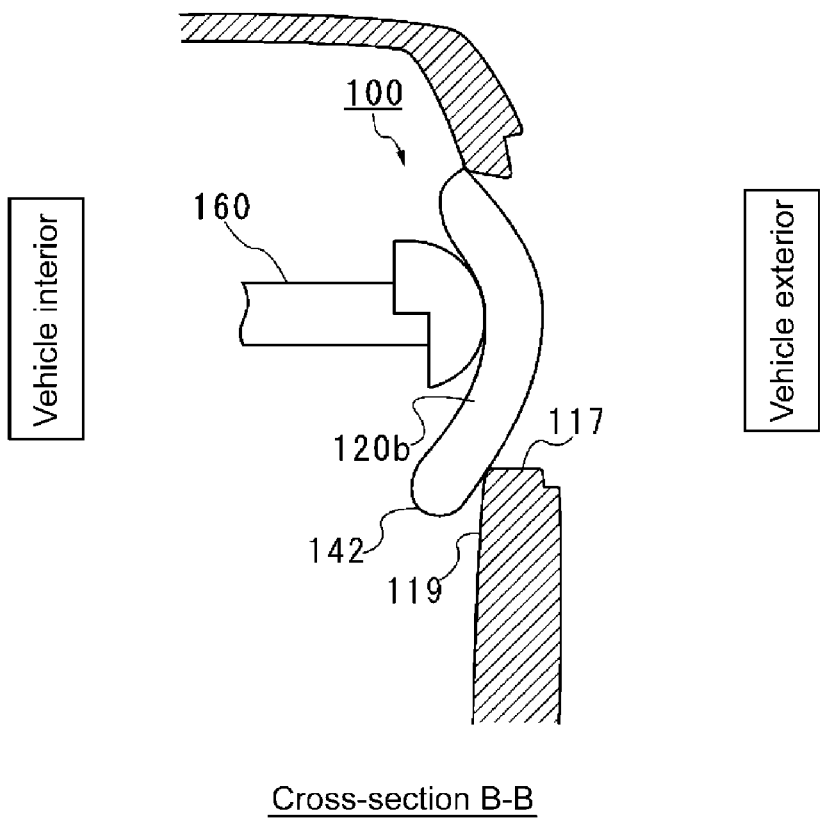
FIG. 5 is a cross-sectional diagram generally taken along line B-B of FIG. 4(b).

FIG. 5 is a cross-sectional diagram generally taken along line B-B of FIG. 4(b). As illustrated in FIG. 5, the lower edge section 142 of the front chamber interferes with the door trim 119. Displacement of the front chamber towards the vehicle exterior is likewise hindered thereby. Hence, the front chamber reduces the likelihood of ejection of an occupant also during an actual collision. Thus, the airbag 100 can deliver high ejection mitigation performance, in particular at the front chamber.

In the embodiment above, the front chamber 120b, which is difficult to support, overlaps the divider-bar 113; also, the front chamber 120b is pulled by the tension support section 140, and has the first tab 130 provided over the shortest way, while the lower edge section 142 of the front chamber 120b is set to overlap the door trim 119. As a result, the ejection mitigation performance is enhanced severally. From among the foregoing, however, the ejection mitigation performance is most distinctively enhanced by virtue of the fact that the front chamber 120b is set to inflate and deploy overlapping the divider-bar 113.

Preferred embodiments of the present invention have been explained above with reference to accompanying drawings, but the described embodiments are exemplary, and the invention may be embodied and implemented in other ways, in accordance with various methods. Unless specifically indicated in the description of the present application, the invention is not restricted by the shape, size, configurational arrangement and so forth of the detailed parts depicted in the drawings. The expressions and terms used in the description of the present application are explanatory in purpose, and are not meant to be limiting in any way, unless restricting subject matter to that effect is specifically set forth in the description.

Therefore, it is obvious that a person skilled in the art can devise various alterations or modifications within the scope as set forth in the claims, and it is to be understood that these alterations and modifications belong, as a matter of course, to the technical scope of the present invention.

In the embodiments, examples have been explained wherein the curtain airbag according to the present invention is used in an automobile, but the present invention can be used, besides automobiles, also in aircraft and ships, to elicit similar effects.

The invention claimed is:

1. A curtain airbag that is stored in an upper portion of a side face section in the interior of a vehicle and that is inflated and deployed along the side face section, the curtain airbag comprising:

a front chamber partitioned by a non-inflation region from and provided at a frontmost side of a main chamber located adjacent to a seat of the vehicle, wherein the front chamber when inflated and deployed overlaps a divider-bar that separates a side window from a front pillar window of the vehicle, the front chamber being restricted to the area beneath a front pillar of the vehicle wherein the front chamber has a single gas inflow port, the gas inflow port being of a size that limits a reception amount of gas per unit time from an adjacent chamber such that inflation and deployment are implemented in the front chamber after implementation with respect to other chambers of the curtain airbag, at least one tab that fixes the front chamber to the vehicle at an upper edge of the front chamber, wherein the at least one tab includes a first tab that is provided on a straight line that joins, in the shortest distance, a front pillar of the vehicle and an impact point center, the impact point center being the center of an assumed impact area of the front chamber.

2. The curtain airbag according to claim 1, wherein a second tab is provided vertically above the impact point center and rearwardly, in a vehicle front-rear direction, of the first tab.

3. The curtain airbag according to claim 2, further comprising: a tension support section that joins a vehicle front side of the front chamber to the front pillar at a location further toward the vehicle front side than the front chamber and that supports the curtain airbag.

4. The curtain airbag according to claim 3, wherein a lower edge section of the front chamber overlaps a door beltline of a front door of the vehicle.

5. The curtain airbag according to claim 4, wherein the gas inflow port is located at an upper portion of the front chamber.

6. The curtain airbag according to claim 2, wherein a lower edge section of the front chamber overlaps a door beltline of a front door of the vehicle.

7. The curtain airbag according to claim 1, further comprising a tension support section that joins a vehicle front side of the front chamber to the front pillar at a location further toward the vehicle front side than the front chamber and that supports the curtain airbag.

8. The curtain airbag according to claim 1, wherein a lower edge section of the front chamber overlaps a door beltline of a front door of the vehicle.

* * * * *